United States Patent
Gilbert et al.

(10) Patent No.: US 8,271,006 B1
(45) Date of Patent: Sep. 18, 2012

(54) ENHANCED PAGE MESSAGING IN SHORT MESSAGE SERVICE ENVIRONMENTS

(75) Inventors: Deborah L. Gilbert, Kansas City, MO (US); Carl J. Persson, Olathe, KS (US); Thomas H. Wilson, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 540 days.

(21) Appl. No.: 12/540,948

(22) Filed: Aug. 13, 2009

(51) Int. Cl.
*H04W 4/00* (2009.01)
*H04W 68/00* (2009.01)
*H04M 3/42* (2006.01)
*H04M 1/725* (2006.01)

(52) U.S. Cl. ........ 455/466; 455/458; 455/433; 455/417; 455/412.1

(58) Field of Classification Search ............... 455/458, 455/466, 433, 417, 412.1
See application file for complete search history.

(56) References Cited

U.S. PATENT DOCUMENTS

| | | | |
|---|---|---|---|
| 2004/0002329 A1* | 1/2004 | Bhatia et al. | 455/422.1 |
| 2004/0209610 A1* | 10/2004 | Adwankar et al. | 455/419 |
| 2004/0235503 A1* | 11/2004 | Koponen et al. | 455/466 |
| 2004/0259573 A1* | 12/2004 | Cheng | 455/456.3 |
| 2005/0075109 A1* | 4/2005 | Neyret et al. | 455/445 |
| 2005/0280557 A1* | 12/2005 | Jha et al. | 340/988 |
| 2008/0200149 A1* | 8/2008 | Zinn | 455/412.1 |

* cited by examiner

*Primary Examiner* — Ariel Balaoing (57) ABSTRACT

A system of enhanced page messaging in a short message service environment is provided. The system comprises a computer system and an application, that when executed on the computer system, receives a first message containing a request to forward the first message to a first portable electronic device wherein the first message is received via a concise textual messaging service. The system also parses at least one of the header and payload content of the first message and determines that the first message is to be delivered as a page message. The system also forwards the first message to the first portable electronic device as a page message.

17 Claims, 8 Drawing Sheets

ENHANCED PAGE MESSAGING IN SHORT MESSAGE SERVICE ENVIRONMENTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Paging technology enables the sending and receiving of short character strings, such as telephone numbers. Paging originally served the medical and emergency service markets and later became popular. Paging has since been largely supplanted by mobile telephones with their voice calling, text messaging, and Internet access capabilities. The popularity of paging technology remains among its original user communities of medical, emergency service, as well as technical support personnel. In hospitals, wherein concentrations of electronic devices and communication may be prevalent, cell phone service may be weak or prohibited due to the risks of interference with medical equipment. The use by pagers of satellite technology to transmit messages may make pagers more reliable in remote areas than cell phones and other devices that use land-based transmission technologies.

SUMMARY

In an embodiment, a system of enhanced page messaging in a short message service environment is provided. The system comprises a computer system and an application, that when executed on the computer system, receives a first message containing a request to forward the first message to a first portable electronic device wherein the first message is received via a concise textual messaging service. The system also parses at least one of the header and payload content of the first message and determines that the first message is to be delivered as a page message. The system also forwards the first message to the first portable electronic device as a page message.

In another embodiment, a method of enhanced page messaging in a short message service environment is provided. The method comprises a messaging server receiving a first message on a short message service network containing a request to forward the first message to a first portable electronic device. The method also comprises the messaging server determining from at least one of the header and payload content of the first message that the first message is to be delivered as a page message. The method also comprises the messaging server determining that the first message is of high priority and the messaging server forwarding the first message to the first portable electronic device. The method also comprises the first portable electronic device exhibiting an alert indicating the high priority associated with the first message. The method also comprises the messaging server one of detecting no response to the first message from the first portable electronic device within a predetermined time period and receiving a second message from the first portable electronic device, the second message indicating that the first portable electronic device is unavailable to respond to the first message. The method also comprises the messaging server forwarding the first message to a second portable electronic device based on detecting no response to the first message from the first portable electronic device within a predetermined time period and receiving the second message, the second portable electronic device designated a recipient in the escalation plan. The method also comprises the second portable electronic device exhibiting an alert indicating the high priority associated with the first message. The method also comprises the messaging server receiving a third message from the second portable electronic device, the third message indicating that the first message was received and further indicating that the second portable electronic device will respond to the first message within parameters described in the escalation plan. The method also comprises the messaging server storing a history of the route of the first message.

In another embodiment, a processor-implemented method of enhanced page messaging in a short message service environment is provided. The method comprises a messaging server receiving a message on a short message service network containing a request to forward the message to a first portable electronic device. The method also comprises the messaging server determining from at least one of the header and payload content of the message that the message is to be forwarded to the first portable electronic device as a page message. The method also comprises the messaging server forwarding the message to the first portable electronic device. When the message is designated as high priority and the messaging server detects that the first portable electronic device does not immediately receive the message, the method also comprises the messaging server copying the message to an electronic file stored on the messaging server and activating an escalation plan to alert a second portable electronic device. When the message is designated as one of medium and low priority, the method also comprises the messaging server copying the message to the electronic file. When the electronic file is one of at and near capacity, the method also comprises the messaging server searching the electronic file for duplicate messages. The method also comprises the messaging server one of consolidating duplicate messages into a single message and deleting all messages related to a single subject with the exception of the most recent message related to the single subject.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of a system of enhanced page messaging in short message service environments permit a message received for forwarding by a short message service (SMS) system to be parsed and forwarded to the intended recipient as a page message. A flag may be activated in the header or text characters may be inserted into the payload of the message that when read indicates that the message is to be forwarded as a page message with the recipient alerted accordingly. The message may be forwarded containing instructions to cause the receiving device to vibrate and/or sound a tone indicating that the incoming message is not a short message service message and is instead a page message. Under some conditions, the message may be subject to escalation and forwarding to additional receiving devices immediately or after a period of time.

Current paging technology may not permit forwarding of page messages, setting and changing of priorities of pages, or altering the character of a page alert based on different circumstances. Traditional paging messages may not be stored, tracked, audited, or analyzed. The system described by the present disclosure adapts some of the benefits of a short message service system to the needs of paging users by permitting text messages to be sent as page messages and for page messages to be given priority and alert characteristics intended to capture the attention of the recipient and differentiate an incoming page message from an incoming text message. The system enables a short message service network to gather and aggregate information about recipient behavior and usage patterns and use the intelligence to make decisions about prioritization, routing, and escalation of incoming messages designated to be forwarded as page messages.

The present disclosure also teaches the gathering and processing of information about message recipients and the making of projections about the likelihood that a page message will be delivered to a recipient under a variety of conditions. The system evaluates information received from portable electronic devices including the current location and battery strength of the portable electronic devices. The system also evaluates information that it originates including the current connection status, received signal strength, and message inbox status of portable electronic devices. The server finally evaluates the historical behavior of portable electronic devices under different circumstances, for example behavior at various locations of a portable electronic device, on different days of the week, and times of day.

The server may generate and compile information about portable electronic devices to which it forwards messages. The server may periodically or on an as-needed basis perform the evaluations described that enable the server to make projections about the likelihood that a given portable electronic device will receive a page message under different operating conditions and circumstances. The system taught by the present disclosure analyzes the information originated externally, the information generated internally, and historical information about behavior patterns of portable electronic devices and their users. When a message is received and is determined to be a page message, the system may combine these analyses with a priority assigned to the message by the sender or by the system. Based on its determinations, the system may change the priority of a page message. The system may automatically assign a priority to a message based on the identity of the sender. After combining the results of its analysis with a received priority and information about the identity of the sender, the system may decide to forward the message to the intended recipient but at the same time or after a predetermined interval institute an escalation procedure that alerts backup or alternate recipient portable electronic devices.

The system may send messages to invoke distinct vibration patterns and/or audible tones to be emitted by the intended portable electronic device as well as by escalation portable electronic devices to indicate an elevated priority or escalated situation. An escalation recipient may learn to recognize these different vibrations and tones as indicative of heightened priority and/or escalation. The system may elevate the volume on a muted recipient portable electronic device in an emergency. The system may turn off nonessential services on a portable electronic device when it detects battery power is low. The system may convert the message payload portion of a page message to a voice message and send the voice message to an alternate destination, for example the home telephone of a recipient, under certain circumstances. When an incoming page message is to be placed in the message inbox of a recipient, the system evaluates the messages already stored and remaining inbox capacity. The system may reprioritize messages, combine duplicate messages, and delete some aged messages.

Figure 1:
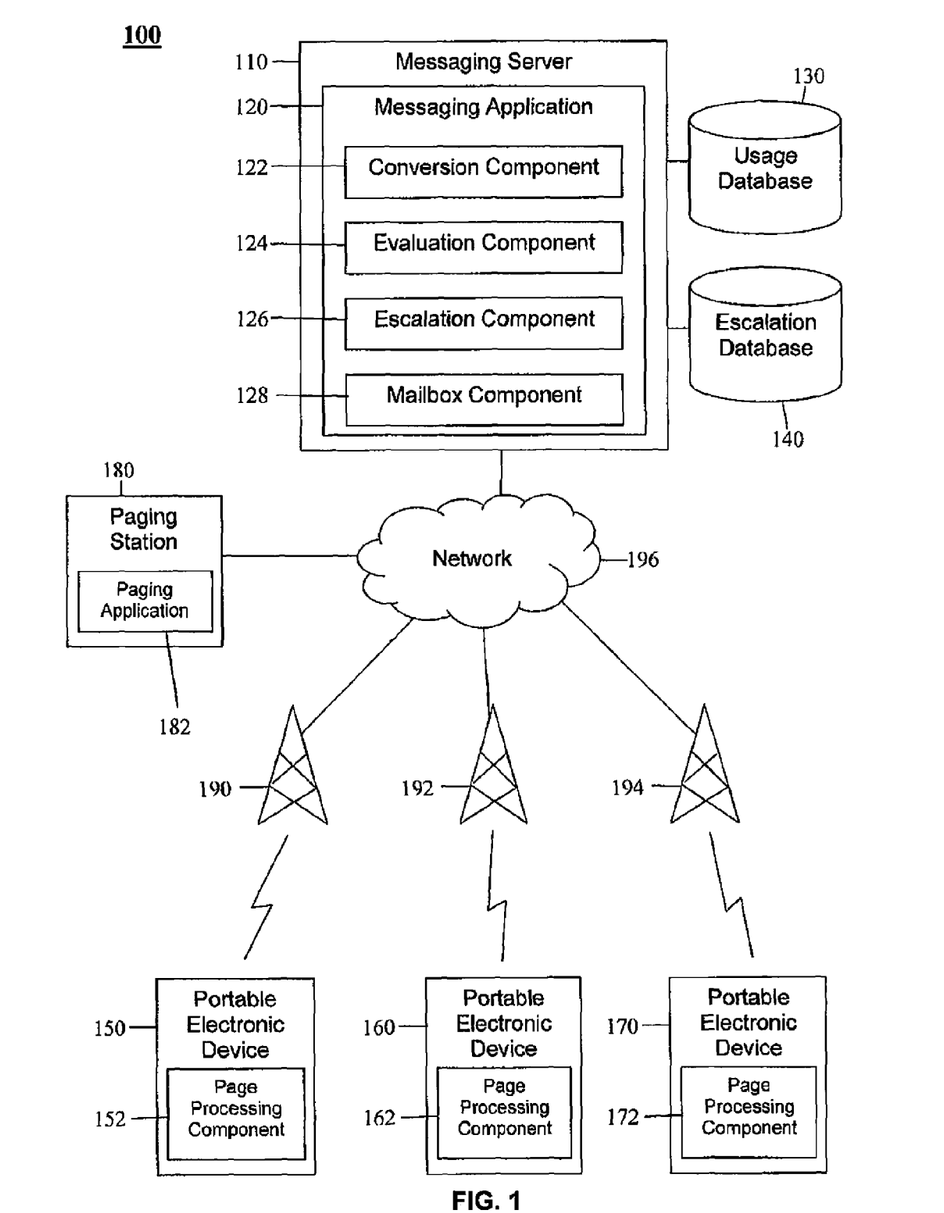
FIG. 1 is a block diagram of a system according to an embodiment of the disclosure.

Turning now to FIG. 1, a system 100 of enhanced page messaging in short message service environments is provided. The system 100 comprises a messaging server 110, a messaging application 120, a usage database 130, an escalation database 140, portable electronic devices 150, 160, 170, a paging station 180, base transceiver stations 190, 192, 194, and a network 196.

The messaging server 110 receives short message service messages from originating portable electronic devices 150, 160, 170 and other devices (not shown), determines routing, and forwards short message service messages to their intended destination portable electronic devices 150, 160, 170. The messaging server 110 may perform some functions of an SMS gateway to permit the transmission of short message service messages to and from non-mobile telephones and other devices. Short message service messages may henceforth be referred to as text messages.

The messaging server 110 may be a computer system. Computer systems are discussed in greater detail hereinafter. The messaging server 110 may comprise one computer or a plurality of computers, for example, a server farm wherein many server computers cooperate to share a processing load. The messaging server 110 may comprise a plurality of computers that are located at different places, for example, to provide geographical diversity and increased service reliability. The messaging server 110 executes one or more applications that provide message processing and transmission services including the messaging application 120. The messaging server 110 may concurrently support a plurality of independent paging systems. For example, the messaging server 110 may host a first hospital paging system associated with a first paging escalation definition and may concurrently host a second electrical power distribution system paging system associated with a second paging escalation definition. The first paging escalation definition and the second paging escalation definition in the example would be supported by components of the messaging application 120. In an embodiment, paging messages associated with independent paging systems may be handled by a single messaging application 120. Alternatively, in another embodiment, paging messages associated with independent paging systems may be processed by independent execution instances of the messaging application 120 executing on the same messaging server 110.

The messaging application 120 receives, processes, and forwards short message service or text messages originated by portable electronic devices 150, 160, 170. When an originating portable electronic device 150 sends a short message service or text message that it wishes to be delivered to the intended recipient as a page message, a flag may be placed in the header of the text message. A character string or other arrangement of characters alternatively may be placed in the message payload of the text message. The flag or other characters are read and interpreted by the messaging application 120 to indicate that the sending portable electronic device 150 wishes the text message to be delivered as a page message. The flag or embedded characters also may indicate a priority to be assigned to the message when it is forwarded. Because the text message is to be delivered as a page message, the messaging application 120 may forward the message with flags, characters, or coding that when received and processed by a page processing component 162 of the recipient portable electronic device 160 cause a vibration or audible tone to be emitted by the recipient portable electronic device 160. The vibration or tone may be different from that emitted when a standard text message is received and may be of a character that the user of the recipient portable electronic device 160 becomes immediately aware that a page message as opposed to a text message has been received. The flag or characters parsed from the incoming message by the messaging application 120 may also indicate an elevated priority desired by the sending portable electronic device 150. The messaging application 120 in forwarding the text message as a page message may use signaling such that the message when received by the page processing component 162 of the recipient portable electronic device 160 emits vibrations or tones clearly indicative of the elevated priority.

The messaging application 120 also receives and processes information made available by portable electronic devices 150, 160, 170 that may at various times be recipients of page messages. Portable electronic devices 150, 160, 170 periodically make known their physical locations and current battery strength to the messaging application 120 with this information being stored by the messaging application 120. The present disclosure teaches the messaging application 120 using information generated by and otherwise available on the short message service network about portable electronic devices 150, 160, 170 to make inferences about the likelihood that a page message will be received and answered. Current signal strength, connection status, and message mailbox status is information resident on the messaging server 110 and elsewhere in a short message service network that may be combined with information provided by portable electronic devices 150, 160, 170. The messaging application 120 also evaluates previous behavior of portable electronic devices 150, 160, 170 and their users under various circumstances to determine a probability that a page message will be received and provided the attention warranted by the priority specified.

The messaging application 120 also activates escalation plans in response to incoming message priority and arising from the identity of some sending portable electronic devices 150, 160, 170. The messaging application 120 additionally activates escalation plans resulting from evaluations made about information in its possession regarding currently developing situations and the likelihood that a related page message will be received and answered appropriately given the severity of each situation. Escalation plans may be formally instituted message routing lists developed for crisis management situations. Escalation plans may also be developed on an ad hoc or "on the fly" basis by the messaging application 120 in response to evaluations it has made during a specific emergency situation. The instructions in an escalation plan may prompt the messaging application 120 to cause a recipient portable electronic device 160 to emit a vibration or tone different from those received when a non-escalation or non-emergency page message is received.

While the exemplary embodiments of the system 100 described in detail above may relate to messages transmitted as short message service or text messages on a short message service network, transmitting and receiving concise textual messages using other communication mechanisms and/or communication protocols is within the spirit and scope of the present disclosure. In some contexts this may be referred to as a concise textual messaging service. The messages may be transmitted on networks employing other technologies, for example multimedia messaging service (MMS) networks, or other network transmission technology that support the exchange of brief, textual communications between at least two parties. The messages may be sent as concise textual messages on idle communication resources or by robbing low order bits in either a signaling channel or a traffic channel. The messages may be sent as concise textual messages on temporarily idle radio spectrum. Further, it is contemplated that the messages may be sent using future communication technologies that represent further evolution or broadening of short message service technology, a communication service originally standardized in the global system for mobile communications (GSM) mobile communication system and subsequently receiving support to include additional mobile technologies comprising American national standards institute (ANSI) code division multiple access (CDMA) and satellite and landline networks.

The messaging application 120 comprises the conversion component 122 that parses incoming short message service messages and recognizes when these messages contain flags, characters, codes, or other indicia alerting it that the message is to be forwarded as a page message instead of as an ordinary text message. The presence of the flag or characters in the incoming message may also cause the conversion component 122 to locate in the message a designated priority to assign to the message when it is delivered as a page. The conversion component 122, in marking a message as a page, may alter the header or message payload of the forwarded message so the page processing component 162 of the recipient portable electronic device 160 recognizes the message as a page. The alteration of the header or message content to indicate that the message is a page, may include coding that the hardware circuitry and/or firmware or software executing on the recipient portable electronic device 160 recognizes as an instruction to emit a special vibration or tone used for page messages only. Additional instructions may prompt the emission of yet a different vibration or tone when the message is a page message sent as a result of an escalation wherein the recipient is an escalation contact instead of the original intended recipient and the underlying situation may be becoming increasingly urgent.

The conversion component 122, in addition to interpreting flags and characters in incoming messages and modifying outgoing messages to signify page status, also interacts with other components of the messaging application 120 to determine how messages should be forwarded as pages. In an embodiment, a message may be received for forwarding as a page message wherein no priority is specified but the messaging application 120, through its evaluation of stored information about sending and receiving portable electronic devices 150, 160, 170 and/or its accessing of stored escalation plans or lists, determines that a priority should be set or raised. The messaging application 120 may further determine that additional portable electronic devices 150, 160, 170 should be sent alerts as backup to assure that an urgent situation does not worsen. The conversion component 122 executes instructions received from the other components of the messaging application 120 that perform evaluations of existing and newly generated information about the recipient portable electronic device 160 and the underlying situation and provide direction as to the delivery of the page message.

The messaging application 120 also comprises the evaluation component 124 that analyzes information received from portable electronic devices 150, 160, 170, information resident in the messaging server 110 about portable electronic devices 150, 160, 170, and information drawn from associated databases and other sources about behavior patterns, tendencies, and habits of some users of portable electronic devices 150, 160, 170. Location and battery life information may periodically be received from a portable electronic device 150 or from base transceiver stations 190, 192, 194 transmitting signals on behalf of the portable electronic device 150. The evaluation component 124 may be able to determine where the portable electronic device 150 is presently located and the time remaining before its battery is exhausted. The evaluation component 124 may send a message to the portable electronic device 150 notifying it that its battery soon may be exhausted.

The evaluation component 124 also gathers information available on the messaging server 110, associated databases, and elsewhere in the hosting short message service network about the recipient portable electronic device 160. The current connection status, signal strength, and message inbox status are examples of information that the evaluation component 124 may obtain without contacting the recipient portable electronic device 160. This information may in an embodiment be obtained by querying other network components typically found in wireless networks, for example a home location register database/home subscriber service database (HLR/HSS), a mobile switching center (MSC), or a visitor location register (VLR). The current connection status of a recipient portable electronic device 160 may, for example, be disconnected or the user may be engaged in an extended voice telephone call. In either case, based on this information alone, the evaluation component 124 may direct that the page message be forwarded to backup contacts found in an escalation list associated with the recipient portable electronic device 160 or in an escalation list associated with the portable electronic device 150 that originated the message.

The evaluation component 124 may combine elements of information received from the recipient portable electronic device 160 with information generated internally or found elsewhere. By determining the approximate location of the recipient electronic device 160 and combining this information with current signal strength information obtainable from components resident in the system 100, the evaluation component 124 may determine, for example, that the recipient portable electronic device 160 likely will not receive the page message if it is sent and may be too far out of range of a base transceiver station 190 to be able to effectively respond to the underlying emergency if it did receive the page message. In another example, the evaluation component 124 may observe that the recipient portable electronic device 160 presently has been occupied for the last ninety minutes on a voice call, its battery is about to expire, and its message inbox is at full capacity. While in both examples the page message to be forwarded might, when originated, be of normal and not elevated priority, the evaluation component 124 may determine that because it is unlikely that the recipient portable electronic device 160 will receive the page message, the page message should be forwarded to a backup portable electronic device 160 described in an escalation list. The evaluation component 124 makes inferences, determinations, and executes routing and escalation decisions with the conversion component 122 based on the data available to it.

The evaluation component 124 also considers information previously gathered and stored in the usage database 130 and elsewhere about the behaviors and habits of portable electronic devices 150, 160, 170 and their users under a variety of circumstances. The evaluation component 124 may determine, for example, that a surgeon carrying a portable electronic device 160 will likely not respond to page messages on weekdays in the early morning because the surgeon is often in surgery at those times. The surgeon's portable electronic device 160 may be locally situated, fully charged, and generating a strong signal, but the evaluation component 124 determines from historical information about the portable electronic device 160 to send page messages to a backup portable electronic device 170 carried by an associate of the surgeon during those times. Over an extended period and from observing behavior under a variety of circumstances, the evaluation component 124 can make inferences about future behaviors. For example, if the aforementioned surgeon is determined on a weekday morning not to be at the hospital, the evaluation component 124 infers that the surgeon is not in surgery. If the surgeon is present at the hospital on a weekday morning, an antenna or base transceiver station 190 may assist the evaluation component 124 that covers the surgical area in inferring that the surgeon is in surgery. When these inferences about behavior are combined with factual information gathered on a real time basis about a portable electronic device 150 and historical trend data about the same items of information, the evaluation component 124 may make informed projections about the likelihood that a page message may be received and acted on when delivered and based on those projections, when and how a page message should be escalated.

The evaluation component 124 in making its determinations may employ statistical models and methods. It may enter data into algorithms, formulae, or applications that perform a variety of mathematical operations on the data. The evaluation component 124 may determine, by contrast, a simple likelihood that a page message will be answered. It may make determinations that are entered into a previously established escalation plan for a group of portable electronic devices 150, 160, 170 working together in a department of a company, hospital, or government agency, for example.

The messaging application 120 also comprises the escalation component 126 that locates escalation plans and lists stored in the escalation database 140 or elsewhere. The escalation component 126 provides instructions to the conversion component 122 regarding insertion of escalation flags into page messages and manages the execution of steps directed in escalation plans until all steps have been taken and a termination point has been reached. The escalation component 126 may take direction from the evaluation component 124 after the evaluation component 124 has determined from its computations that the priority for a page message should be raised and an escalation plan be implemented. In some embodiments, an escalation plan may already exist in the escalation database 140 for a particular situation. The escalation component 126 takes actions directed in the escalation plan regarding the additional or backup portable electronic devices 150, 160, 170 to contact. An escalation plan may describe how page alerts are to invoke the distinct vibration or audible tone to be emitted by the additional or backup portable electronic devices 150, 160, 170.

The escalation component 126 may detect when a portable electronic device 150 is currently engaged in a voice or data session and may be unaware that a page message was received. In such an instance, when a page message of high priority is received, a different type of alert may be necessary to alert the user already engaged in an active session. The escalation component 126 responds appropriately when the evaluation component 124 detects these situations when a different and more urgent alert may be necessary to alert the user. The escalation component 126 communicates accordingly with the conversion component 122 to assure that the proper coding or characters are inserted into the forwarded page message.

In addition to sending escalation page messages to escalation or backup portable electronic devices 150, 160, 170 described in an escalation plan, the escalation component 126 may follow up by initiating additional contact with other parties involved in a situation to request if they have received resolution. The escalation component 126 may follow steps described in an escalation plan unrelated to sending page messages. Such steps may send automated voice messages surveying a contact when a crisis has passed or furnishing supplementary information for the contact's use in closing a file related to an incident or situation. In some embodiments, no escalation plan or list may exist for a situation or recipient portable electronic device 160, and the escalation component 126 may simply send an escalation page message to the supervisor or backup contact listed in the contact information for the recipient portable electronic device 160. In some embodiments, a page message may be automatically escalated when received from certain predetermined senders. A physician may request, for example, that all page messages received from the hospital with which he is affiliated are escalated so that his designated backup contact or office always receives page messages sent by the hospital.

The messaging application 120 also comprises the mailbox component 128 that periodically and on an as-needed basis examines the electronic files or inboxes in which incoming page messages for portable electronic devices 150, 160, 170 are stored. When the connection status of a recipient portable electronic device 160 is for some reason disconnected, incoming page messages may go immediately to the inbox. When the inbox for a recipient portable electronic device 160 is at or near capacity and a page message may need to be stored, the mailbox component 128 may analyze the messages currently stored and consolidate stored messages with the same subject line to conserve inbox storage space. The mailbox component 128 may alternatively delete stored messages on the same subject except the more recent messages on the subject. The mailbox component 128 may simply delete messages that are older than a predefined age. The mailbox component 128 may change the order of stored messages from a chronological order to an order by message priority. The order may be changed such that page messages sent by specific senders are listed first or last or deleted. If standard text messages are stored in the same inbox as page messages, the mailbox component 128 may list page messages together and separate from saved standard text messages.

The usage database 130 is associated with the messaging server 110 and stores information about behaviors and tendencies of portable electronic devices 150, 160, 170 and their users under a variety of conditions and circumstances. The information in the usage database 130 is drawn upon by the evaluation component 124 and may be incorporated into algorithms, applications, and decision processes used by the evaluation component 124 in determining how to forward and perhaps escalate a page message under a specific set of circumstances. The evaluation component 124 may examine previous behaviors of a recipient portable electronic device 160 under similar circumstances. The evaluation component 124 may combine that behavioral information with current factual information about reported battery life and location as well as connection status, signal status, and message inbox status of the recipient portable electronic device 160 to make a decision about forwarding and escalation of a page message. The information in the usage database 130 also may be used in building new escalation lists and plans and reviewing existing escalation plans to make service improvements. In an emergency, the evaluation component 124 may examine information stored in the usage database 130, and make a decision that, under the current conditions, it is highly unlikely that a recipient portable electronic device 160 will receive a message based on how the recipient portable electronic device 160 has previously behaved. Because the evaluation component 124 continually calculates probabilities that page messages will be received and responded to appropriately under a variety of conditions, the evaluation component 124, in searching the usage database 130, may seek to discover patterns of behavior over time to assist in making inferences and ultimately decisions about forwarding and escalations, if necessary.

While the usage database 130 stores information about behaviors of portable electronic devices 150, 160, 170 under various conditions, the contents of the usage database 130 primarily may be data about short message service messages forwarded as page messages and the factual information surrounding those messages such as location of recipient portable electronic device 160, day of the week, time of day, and message inbox status at the time. This information is stored for a period of time and may be compiled in various manners, analyzed, audited, and even sold to outside parties for their use once the data has been redacted to satisfy privacy and security policies. As the volume of information in the usage database 130 grows, the statistical reliability, meaningfulness, and value of the information to the system 100 and outside parties also may grow.

The escalation database 140 stores escalation plans and escalation contact lists. The escalation component 126 accesses the escalation plans and escalation contact lists when directed and advised by the evaluation component 124 that a text message is to be forwarded as a page message arising from an escalation. An escalation plan may be a plan specifically developed for forwarding and rerouting page messages to specific portable electronic devices 150, 160, 170 under special sets of circumstances. An escalation plan may involve only specific originating portable electronic devices 150, 160, 170 and specific receiving portable electronic devices 150, 160, 170. An escalation plan may additionally or alternatively cover situations specific to certain days of the week or times of day. Escalation plans developed by hospitals, emergency service providers, and civil defense organizations may be tied to emergency codes developed by these organizations for specific types of emergencies.

Escalation lists stored in the escalation database 140 may contain the names and contact information of each party to be alerted if the previously contacted party does not receive and/or respond to the message. Escalation plans may contain instructions for how page messages should be brought to the attention of portable electronic devices 150, 160, 170 in the form of more perceptible vibrations or louder audible tones. If a physician or law enforcement official, for example, has intentionally muted the volume of his portable electronic devices 150, an escalation plan under certain circumstances may detect this and raise the volume to an audible level. If the recipient portable electronic device 160 is currently in a voice session, in an emergency that session might be interrupted if an emergency is severe. Page messages may be converted to voice messages and sent to the home telephone of a user if the location of the recipient portable electronic device 160 is detected to be at the home address of the user and mobile telephone reception at that location is not good.

Portable electronic devices 150, 160, 170 send and receive messages on short message service and other networks. In addition to text messages, portable electronic devices 150, 160, 170 also may make telephone calls, send and receive electronic mail messages, and have the capability to browse various sites and interact with other parties on the world wide web. Portable electronic devices 150, 160, 170 may be mobile telephones, personal digital assistants (PDA), tablet computers, or laptop computers. In an embodiment, portable electronic devices 150, 160, 170 may be more limited-use devices that send and receive text messages only and cannot send and receive graphic or video content nor engage in voice telephone calls. The portable electronic devices 150, 160, 170 comprise page processing components 152, 162, 172, respectively, that may comprise hardware circuitry, firmware, and software that enable the portable electronic devices 150, 160, 170 to interpret incoming text messages as page messages. The page processing components 152, 162, 172 detect flags, characters, or coding in the headers or payload content of incoming transmissions that cause them to emit vibrations, audible tones, or other perceptible signals at varying intensity levels such that a short message service message received as a page message can be differentiated from a standard text message. The page processing components 152, 162, 172 additionally detect different levels of priority and escalation and cause the appropriate vibrations or audible tones to be emitted by the portable electronic devices 150, 160, 170. In an embodiment, the portable electronic device 150 may be referred to as the first portable electronic device 150, and the portable electronic device 160 may be referred to as the second portable electronic device 160.

The paging station 180 is a desktop computer or other electronic device that may be accessed by a dispatcher or other party originating messages in a medical office, hospital, or communications center of a law enforcement agency, emergency service provider, technical support organization, public utility, telephone or internet service provider, or other organization. The paging station 180, in an embodiment, may be circuitry integrated into a device that performs tasks and functions unrelated to the system 100. The paging application 182 is software executing on the paging station 180 that may originate or forward short message service messages, electronic mail messages, or other electronic transmissions to the messaging server 110 for processing by the messaging application 120 and forwarding as page messages to recipient portable electronic devices 150, 160, 170. In an embodiment, for example but not by way of limitation, a dispatcher in the communications center of a power company may use the paging application 182 running on the paging station 180 to generate messages to field personnel deployed to an area affected by a hurricane or earthquake. The field personnel may be carrying portable electronic devices 150, 160, 170 that receive the messages originated by the paging application 182.

Base transceiver stations 190, 192, 194 may be any of cellular wireless base stations, for example a Code Division Multiple Access (CDMA), Global System for Mobile Communications (GSM), Universal Mobile Communications System (UMTS), and/or Long-term Evolution (LTE) cellular wireless base station; a World-wide Interoperable Microwave Access (WiMAX) base station; a WiFi access point; or other wireless access devices.

The network 196 promotes communication between the components of the system 100. The network 196 may be any communication network including a public data network (PDN), a public switched telephone network (PSTN), a private network, and/or a combination thereof.

In a hospital setting, additional antennas, femtocells, and picocell devices may be placed throughout the hospital building or campus to improve paging reliability. The antenna, femtocell, or picocell that a portable electronic device 150 is presently active on may be used to quickly and with low cost in terms of network bandwidth, time, and processor cost provide an initial approximate indication of the location of the portable electronic device 150.

Figure 2A:
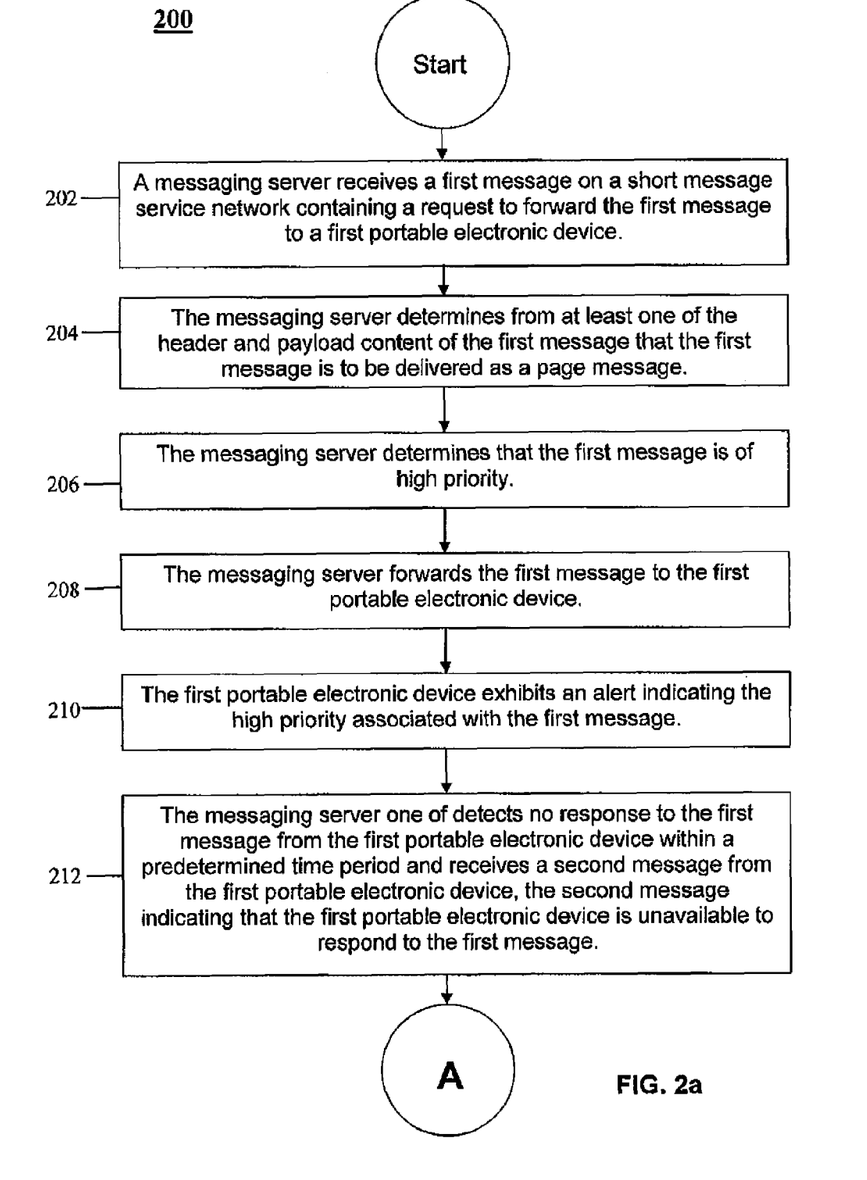
FIG. 2a and FIG. 2b are flow charts illustrating a method according to an embodiment of the disclosure.
Figure 2B:
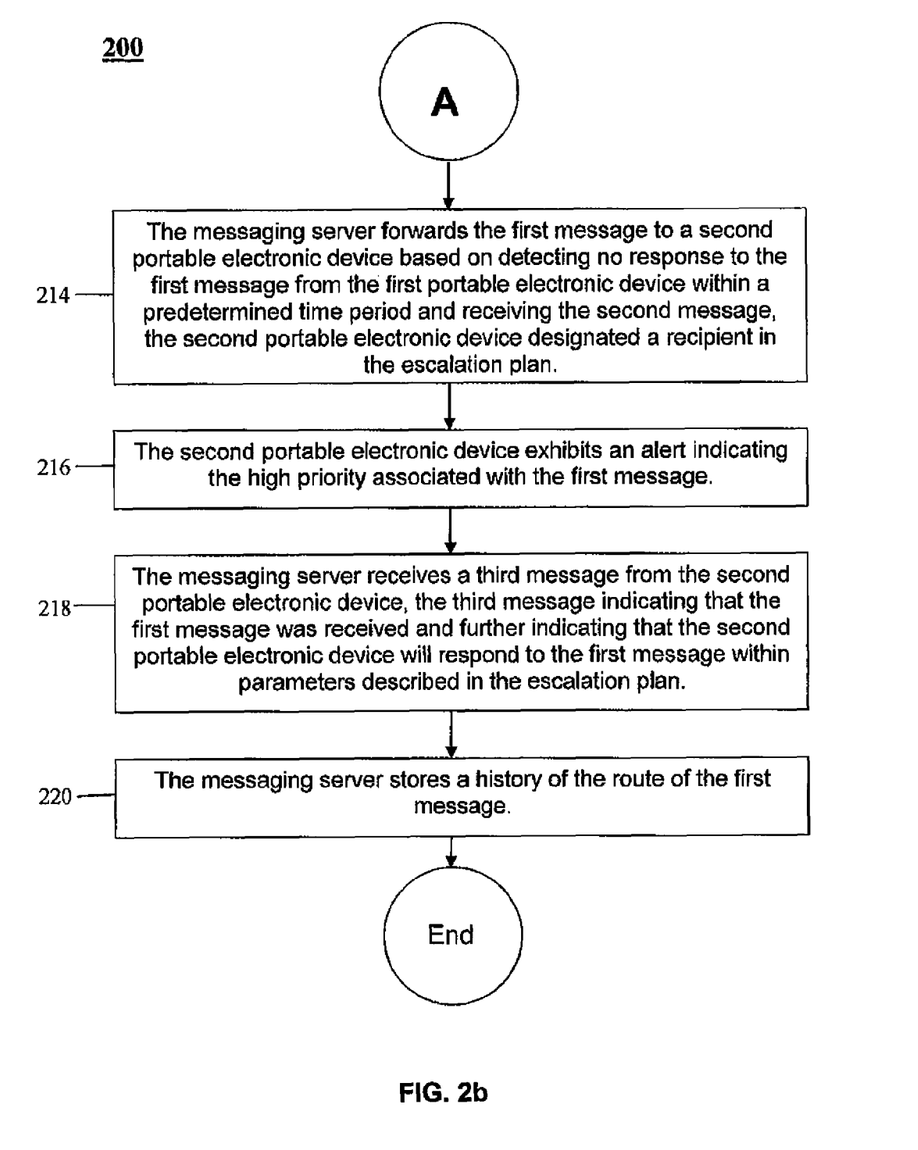

Turning now to FIG. 2a and FIG. 2b, a method 200 of enhanced page messaging in short message service environments is provided. Beginning at block 202, the messaging server 110 receives a first message on a short message service network, the first message containing a request to be forwarded to a first portable electronic device 150.

At block 204, the messaging server 110 parses the first message and determines that a flag, characters, or other coding is present in the header, content payload, or elsewhere in the first message indicating that the first message is to be delivered as a page message. At block 206, the messaging server 110 further determines that the first message is of high priority. The high priority setting may have been the intention of the sender and indicated by a flag or character embedded in the first message. The high priority assigned to the first message may arise strictly from the identity of the sender. In an embodiment, all messages from a particular sender may be assigned high priority. The first message may have been received with normal priority or no priority but the high priority may have been determined by the evaluation component 124 as a result of its analysis of information presently available to it or inferences made by the evaluation component 124. An escalation plan or escalation list may be present in the escalation database 140 that requires the first message to be given high priority based on one or more conditions in effect at the present time.

At block 208, the messaging server 110 forwards the first message to the first portable electronic device 150. At block 210 the first portable electronic device 150 exhibits a vibration and/or audible tone indicating that the first message is a page message and further indicating that the message is of high priority. The vibration and/or audible tone may be perceptible as different from those associated with standard text messages and different from those associated with page messages not of high priority. The first portable electronic device 150 emits the specialized vibration and/or audible tone for high priority page messages because the messaging server 110 in forwarding the first message inserted coding into the first message interpreted by the first portable electronic device 150 as instructions to emit the vibration and/or audible tone.

At block 212, the messaging server 110 either detects no response from the first portable electronic device 150 within a predetermined time period or receives a second message from the first portable electronic device 150 indicating that it is unavailable to respond to the first message. The escalation component 126 of messaging application 120 may have set a timer to measure the response time within the predetermined time period because of instructions contained in an escalation plan instituted due to the high priority associated with the first message. The escalation component 126 is active because the message is of high priority and because the first portable electronic device 150 either failed to respond or replied that it would be unable to respond to the first message.

At block 214, the messaging server 110 forwards the first message to the second portable electronic device 160 based on the events at block 212 wherein the first message could not be answered by the first portable electronic device 150 in accordance with the escalation plan associated with the high priority of the first message. The escalation component 126 noted in the escalation plan that the second portable electronic device 160 is the designated escalation contact for this situation. At block 216, the second portable electronic device 160 emits a vibration and/or audible tone indicating the high priority associated with the first message. The vibration and/or audible tone emitted by the second portable electronic device 160 may indicate the message priority and that the message has been escalated. The escalation component 126 instructs the conversion component 122 to set the vibration and/or audible tone in the first message to the second portable electronic device 160 to be perceptible as an escalation page message instead of a standard text message or page message. In an embodiment, the escalation component 126 may convert the escalation message to a voice message and send the voice message to the office or home telephone number associated with a user of the second portable electronic device 160, send an electronic mail to a distribution list, or take other additional action defined in the escalation plan.

At block 218, the messaging server 110 receives a third message from the second portable electronic device 160. The third message indicates that the second portable electronic device 160 has received the first message and indicates that the second portable electronic device 160 will respond to the first message within the parameters of the escalation plan. The escalation component 126, whose function is to monitor the progress of high priority and/or escalated page messages through the system 100 until the requirements of the associated escalation plan have been met, notes the affirmative response of the second portable electronic device 160 in a record associated with the first message.

At block 220, the messaging server 110 stores the record of the first message in the usage database 130 or elsewhere. The record of the first message may contain descriptions of all of the actions and dialogue that took place with reference to the receipt, processing, forwarding, escalation, and final disposition of the first message. The record of the first message may be auditable and may be useful in the future to the evaluation component 124 in projecting behaviors and response times when processing other messages. The record of the first message may additionally be useful to the system 100 in making service improvements.

Figure 3A:
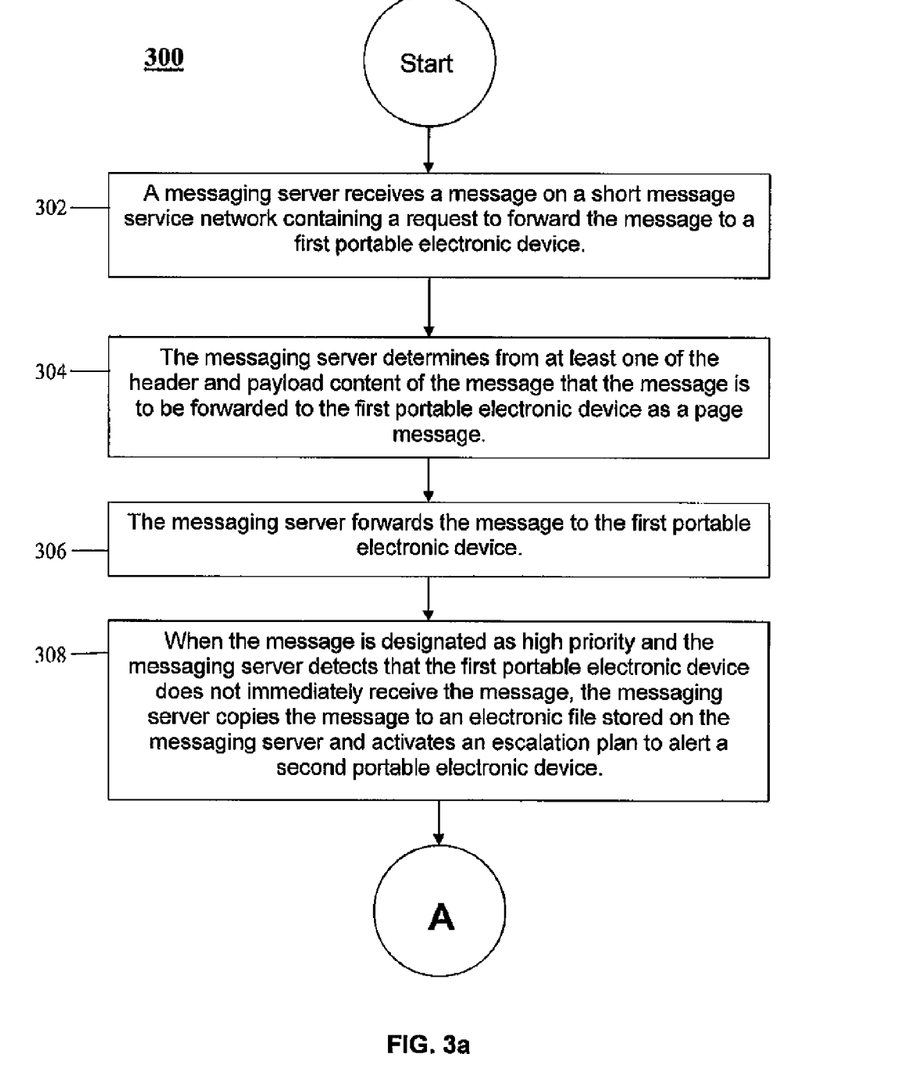
FIG. 3a and FIG. 3b are flow charts illustrating another method according to an embodiment of the disclosure.
Figure 3B:
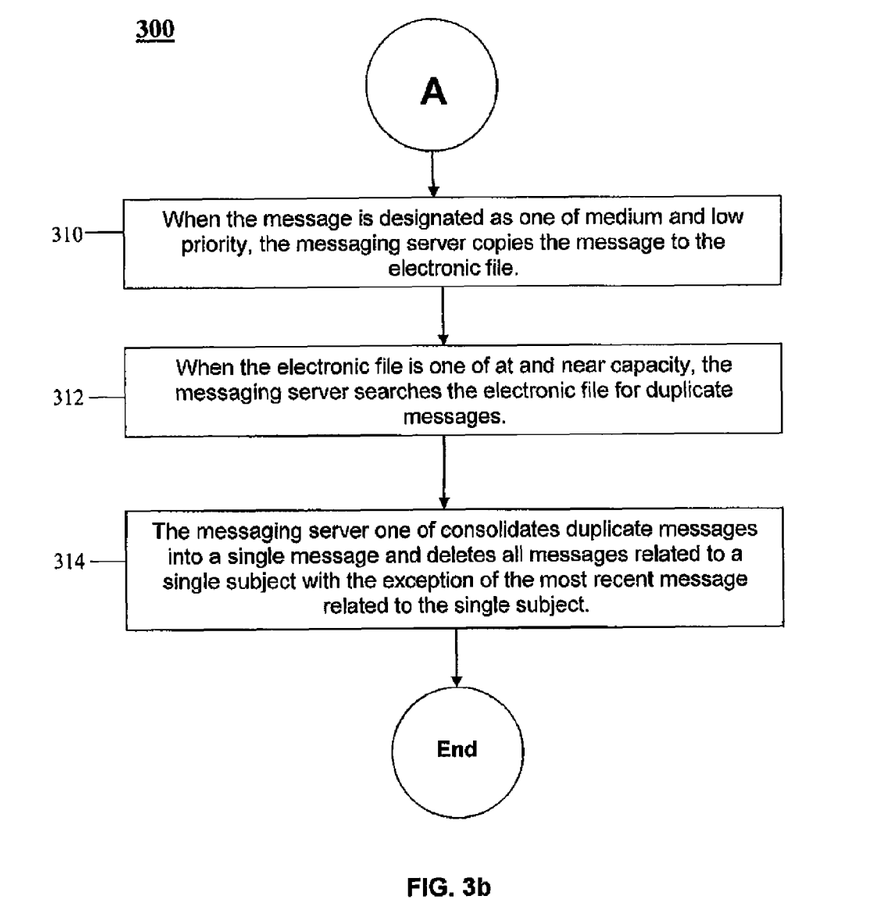

Turning now to FIG. 3a and FIG. 3b, a method 300 of enhanced page messaging in short message service environments is provided. At block 302, the messaging server 110 receives a message on a short message service network with a request to forward the message to a first portable electronic device 150. At block 304, the messaging server 110 determines from its parsing of the message that the message is to be forwarded as a page message. At block 306, the messaging server 110 forwards the message to the first portable electronic device 150 and may include instructions to the first portable electronic device 150 that it emit a vibration and/or audible tone to signify that the message is a page message.

At block 308, if the message is designated by the sender to be of high priority or determined by the evaluation component 124 after analysis to be of high priority, and the first portable electronic device 150 does not immediately receive the message, the messaging server 110 may locate an escalation plan or escalation list in the escalation database 140 and forward the message for escalation to a second portable electronic device 160. At block 308, the messaging server 110 also copies the message to an electronic file that is the message inbox associated with the first portable electronic device 150. In an embodiment, the message inbox may comprise a plurality of files that in conjunction provide the storage capacity and functionality of a message inbox.

At block 310, if the message is of medium or low priority, the messaging server 110 copies the message to the electronic file containing received messages for the first portable electronic device 150 without involving the escalation component 126 or the second portable electronic device 160 as at block 308.

At block 312, when the electronic file is at capacity or near capacity, for example when less than ten percent of storage space remains available, the messaging server 110 searches the electronic file for duplicate messages. At block 314, the messaging server 110 consolidates duplicate messages into a single message. The messaging server 110 may delete multiple messages related to a single subject with the exception of the most recent message related to the subject.

Figure 4:
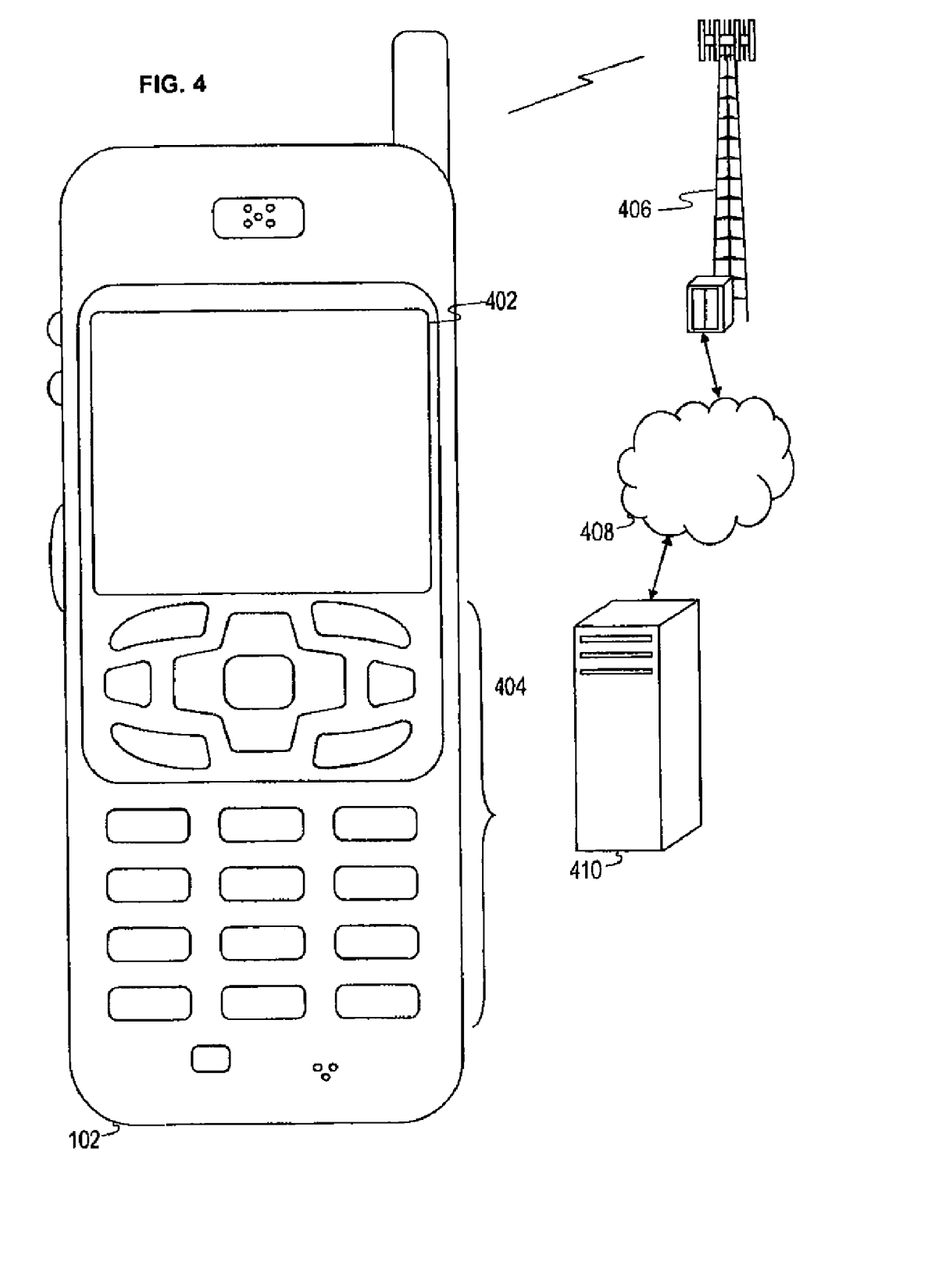
FIG. 4 is an illustration of a mobile device according to an embodiment of the disclosure.

FIG. 4 shows a wireless communications system including the mobile device 102. The mobile device 102 may in some embodiments exemplify the portable electronic device 150, 160, 170 described in the system 100. FIG. 4 depicts the mobile device 102, which is operable for implementing aspects of the present disclosure, but the present disclosure should not be limited to these implementations. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 402 to show a web page. The web page may be obtained via wireless communications with a base transceiver station (BTS) 406, a wireless network access node, a peer mobile device 102 or any other wireless communication network or system. While a single base transceiver station 406 is illustrated, it is understood that the wireless communication system may comprise additional base transceiver stations. In some instances, the mobile device 102 may be in communication with multiple base transceiver stations 406 at the same time. The base transceiver station 406 (or wireless network access node) is coupled to a wired network 408, such as the Internet. Via the wireless link and the wired network, the mobile device 102 has access to information on various servers, such as a server 410. The server 410 may provide content that may be shown on the display 402. Alternately, the mobile device 102 may access the base transceiver station 406 through a peer mobile device 102 acting as an intermediary, in a relay type or hop type of connection.

Figure 5:
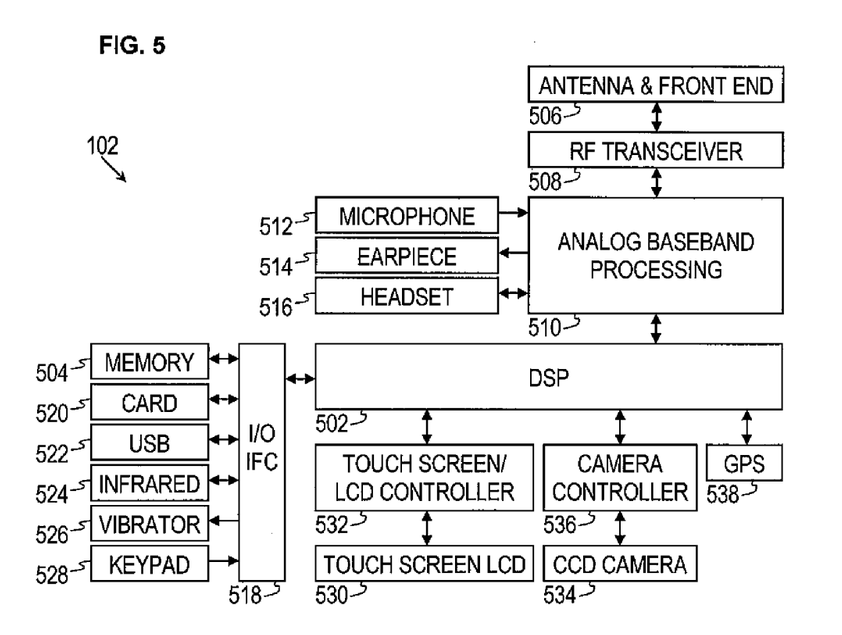
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
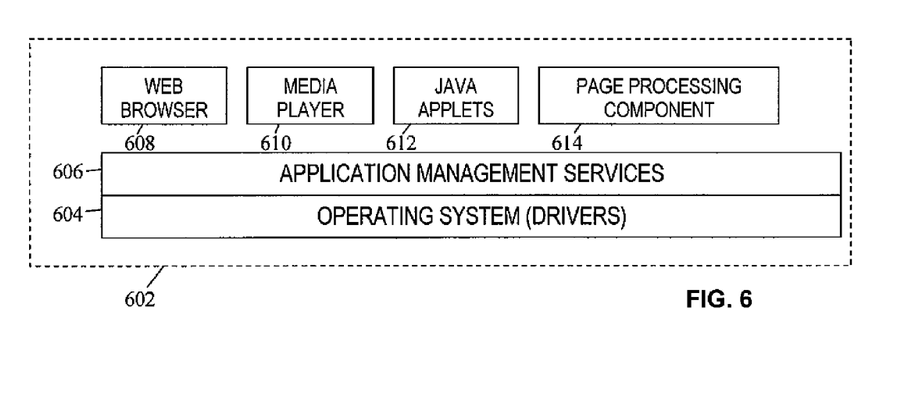
FIG. 6 is a block diagram of a software configuration for a mobile device according to an embodiment of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The page processing component 614 may in some embodiments exemplify the page processing component 152, 162, 172 described in the system 100.

Figure 7:
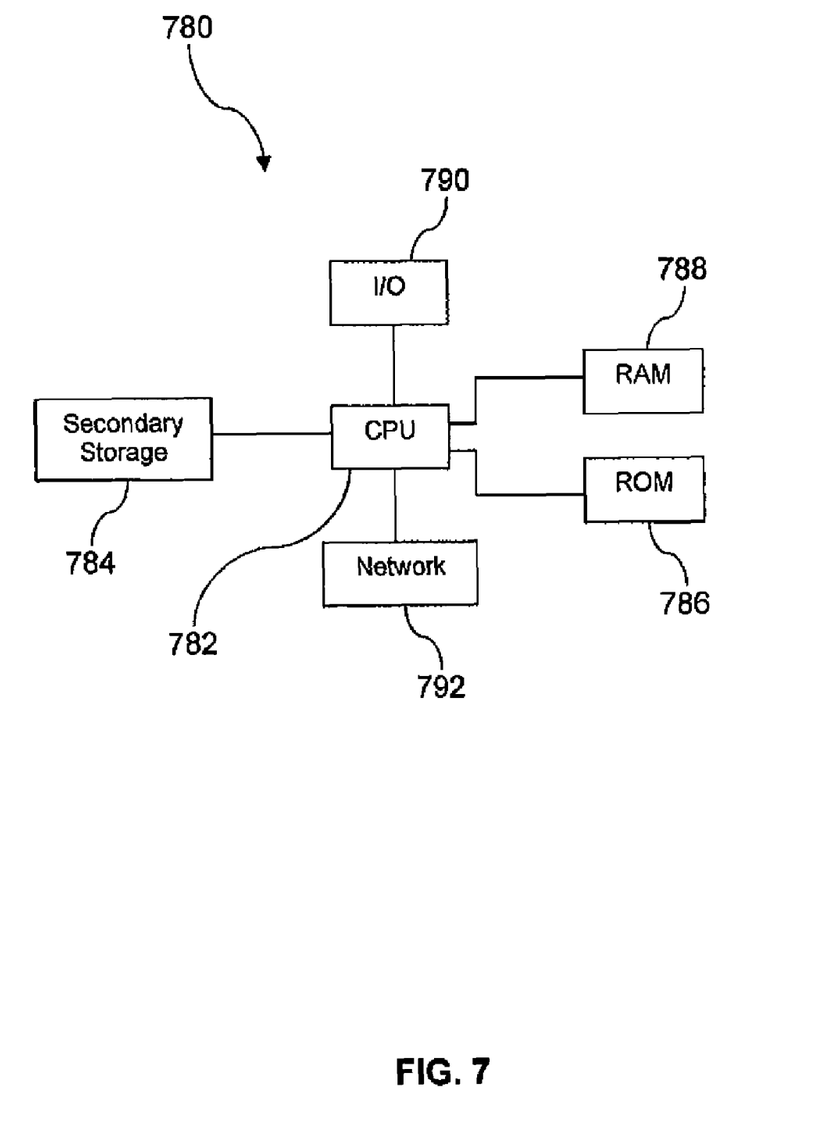
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide 20 virtual servers on 4 physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system of enhanced page messaging in a short message service environment, comprising:
    a computer system; and
    an application that, when executed on the computer system,
        receives a first message containing a request to forward the first message to a first portable electronic device, wherein the first message is received via a concise textual messaging service;
        parses at least one of the header and payload content of the first message and reads at least one of a flag in the header of the first message and a character string in the payload content of the first message;
        determines that the first message is to be delivered as a page message based on the reading of at least one of the flag and the character string;
        forwards the first message to the first portable electronic device as a page message;
        analyzes information reported by the first portable electronic device regarding the battery strength and location of the first portable electronic device;

analyzes current information stored by the application regarding the connection status, signal strength, and message inbox status of the first portable electronic device;

analyzes historical information about the response behavior of the first portable electronic device;

determines a probability based on the analyzed information that the first portable electronic device will receive and respond to the first message within a first predetermined time period; and forwards the first message to a second portable electronic device described in an escalation list when the determined probability does not exceed a predetermined threshold.

2. The system of claim 1, wherein the first message is one of a short message service (SMS) text message and a multimedia messaging service (MMS) message.

3. The system of claim 1, wherein information about the battery strength and location of the first portable electronic device is received at regular intervals from the first portable electronic device and is stored by the application.

4. The system of claim 1, wherein the location of the first portable electronic device is inferred by identifying the wireless base station that relayed a signal most recently transmitted by the first portable electronic device.

5. The system of claim 1, wherein the application additionally sends queries to at least one of a home location register (HLR), a visitor location register (VLR), and a mobile switching center (MSC) to determine a location of the first portable electronic device and based on the location forwards the first message to a second portable electronic device described in an escalation list.

6. The system of claim 1, wherein prior to forwarding the first message the application further modifies the first message to include instructions to cause the first portable electronic device to emit an audible tone or vibration distinct from audible tones and vibrations emitted when messages are short message service text messages or multimedia messaging service messages.

7. The system of claim 1, wherein the application further determines a priority of the first message.

8. The system of claim 7, wherein the application determines the priority of the first message by detecting the flag in the header of the first message or reading the character string in the payload content of the first message.

9. The system of claim 1, wherein the application further determines the first message is of high priority.

10. The system of claim 9, wherein the application determines that the first message is of high priority by detecting the flag in the header of the first message or reading the character string in the payload content of the first message.

11. The system of claim 9, wherein the first portable electronic device exhibits an alert indicating the high priority associated with the first message in response to receiving the first message, and wherein the high priority of the first message is exhibited on the first portable electronic device by at least one of sounding an audible tone and causing a vibration distinct from audible tones and vibrations exhibited when messages are one of standard short message service messages and page messages of medium and low priority.

12. The system of claim 1, wherein the application further delivers all messages received for forwarding from a predetermined source with an elevated priority.

13. A system of enhanced page messaging in a short message service environment, comprising:
a computer system; and
an application that, when executed on the computer system,
receives a first message containing a request to forward the first message to a first portable electronic device, wherein the first message is received via a concise textual messaging service;
parses at least one of the header and payload content of the first message and reads at least one of a flag in the header of the first message and a character string in the payload content of the first message;
determines that the first message is to be delivered as a page message based on the reading of at least one of the flag and the character string;
forwards the first message to the first portable electronic device as a page message;
copies the first message to an electronic file and activates an escalation plan to alert a second portable electronic device when the application determines that the first message is of high priority and detects that the first portable electronic device does not immediately receive the first message;
searches the electronic file for duplicate messages when the electronic file is at or near capacity; and
one of consolidates duplicate messages into a single message and deletes all messages related to a single subject with the exception of the most recent message related to the single subject.

14. The system of claim 13, wherein the application determines that the electronic file is near capacity when less than ten percent total capacity of the electronic file is free space.

15. The system of claim 13, wherein the application further changes the order of messages stored in the electronic file based on a priority determination.

16. The system of claim 13, wherein the application further converts the first message to a voice message and forwards the voice message to a different destination when the electronic file is at or near capacity.

17. A system of enhanced page messaging in a short message service environment, comprising:
a computer system; and
an application that, when executed on the computer system,
receives a first message containing a request to forward the first message to a first portable electronic device, wherein the first message is received via a concise textual messaging service;
parses at least one of the header and payload content of the first message and reads at least one of a flag in the header of the first message and a character string in the payload content of the first message;
determines that the first message is to be delivered as a page message based on the reading of at least one of the flag and the character string;
forwards the first message to the first portable electronic device as a page message;
copies the first message to an electronic file when the application determines that the first message is of medium or low priority;
searches the electronic file for duplicate messages when the electronic file is at or near capacity; and
one of consolidates duplicate messages into a single message and deletes all messages related to a single subject with the exception of the most recent message related to the single subject.

* * * * *